United States Patent
Mercille

(10) Patent No.: US 11,132,694 B2
(45) Date of Patent: Sep. 28, 2021

(54) AUTHENTICATION OF MOBILE DEVICE FOR SECURE TRANSACTION

(71) Applicant: EBAY INC., San Jose, CA (US)

(72) Inventor: Richard Mercille, San Jose, CA (US)

(73) Assignee: PAYPAL, INC., San Jose, CA (US)

(*) Notice: Subject to any disclaimer, the term of this patent is extended or adjusted under 35 U.S.C. 154(b) by 1108 days.

(21) Appl. No.: 14/588,335

(22) Filed: Dec. 31, 2014

(65) Prior Publication Data

US 2016/0189136 A1 Jun. 30, 2016

(51) Int. Cl.
| G06Q 20/40 | (2012.01) |
| G06Q 20/32 | (2012.01) |
| G06Q 20/38 | (2012.01) |
| H04W 12/06 | (2021.01) |
| H04W 4/80 | (2018.01) |

(52) U.S. Cl.
CPC ..... *G06Q 20/4093* (2013.01); *G06Q 20/3226* (2013.01); *G06Q 20/3227* (2013.01); *G06Q 20/382* (2013.01); *G06Q 20/385* (2013.01); *G06Q 20/405* (2013.01); *G06Q 20/4015* (2020.05); *H04W 4/80* (2018.02); *H04W 12/06* (2013.01)

(58) Field of Classification Search
CPC .......... G06Q 20/3227; G06Q 20/3226; G06Q 20/321; G06Q 20/4093; G06Q 20/382; G06Q 20/405; G06Q 20/4015; G06Q 20/385; H04W 12/50; H04W 4/80; H04W 12/06
See application file for complete search history.

(56) References Cited

U.S. PATENT DOCUMENTS

| 6,957,198 | B2 | 10/2005 | Kumhyr | |
| 8,805,726 | B2 | 8/2014 | Fisher | |
| 2005/0113137 | A1* | 5/2005 | Rodriguez | G07F 19/211 455/558 |
| 2007/0192869 | A1* | 8/2007 | Garfinkle | G08B 21/0269 726/26 |
| 2010/0057623 | A1 | 3/2010 | Kapur et al. | |
| 2013/0124346 | A1* | 5/2013 | Baldwin | G06Q 20/353 705/16 |

(Continued)

FOREIGN PATENT DOCUMENTS

WO WO-2012106757 A1 * 8/2012 ........... G07F 7/1066

*Primary Examiner* — Jacob C. Coppola
(74) *Attorney, Agent, or Firm* — Haynes and Boone, LLP

(57) ABSTRACT

There are provided systems and methods for authenticating a mobile device for use in a secure transaction. A user having a master device authenticated for use in a secure transaction system, such as an electronic payment system, identifies a secondary device to be enabled for use in processing a secure transaction. The secondary device connects to a companion device and shares information associated with the secondary device and companion device with a transaction processing server, which returns authentication information associated with both devices. When the user initiates a secure transaction, the secondary device identifies whether the third device is in proximity. The secure transaction is processed only if the second and third devices are in communication and authenticated during the transaction. If the secondary device is lost or stolen, the device may be disabled until reauthenticated through the master device.

20 Claims, 7 Drawing Sheets

(56) References Cited

U.S. PATENT DOCUMENTS

| | | |
|---|---|---|
| 2013/0132307 A1 | 5/2013 | Phelps et al. |
| 2014/0095580 A1 | 4/2014 | Sartini et al. |
| 2014/0123224 A1* | 5/2014 | Nosrati ............ G06Q 20/3278 726/3 |
| 2014/0250016 A1 | 9/2014 | Kranzley |
| 2014/0258132 A1 | 9/2014 | Swamy et al. |
| 2014/0278892 A1 | 9/2014 | Collart |
| 2014/0279477 A1 | 9/2014 | Sheets et al. |
| 2015/0077224 A1* | 3/2015 | Pal ........................ G06F 21/35 340/5.61 |
| 2015/0172920 A1* | 6/2015 | Ben Ayed .......... H04L 63/0492 713/172 |

* cited by examiner

AUTHENTICATION OF MOBILE DEVICE FOR SECURE TRANSACTION

TECHNICAL FIELD

The present application relates generally to mobile devices and more specifically to systems and methods for authenticating a mobile device for use in a secure transaction.

BACKGROUND

Mobile devices such as smart phones and smart watches are enjoying widespread popularity. Some of these devices store sensitive personal information and enable functions that could be harmful to the user if the device was stolen, lost or otherwise accessed by an unauthorized user. For example, a smartphone may store the user's online passwords and credit card information used for online purchases. A smartphone may also be used in place of a credit card to make an electronic payment at a merchant through a digital wallet or electronic payment service. Many devices used for secure transactions include specialized hardware known as "secure elements" to protect the confidential payment information. A secure element may be a tamper resistant card or chip that provides for secure storage of sensitive information and is commonly used in devices to secure electronic payment transactions. With the widespread adoption of specialized mobile devices, including wearable technology such as smart watches, fitness trackers and clothing that monitor fitness activity, it is not always necessary or desirable for a user to carry a smartphone. For example, a user may own a variety of mobile devices and desire the convenience and efficiency of wearable electronic technology for certain applications without sacrificing security.

Figure 1:
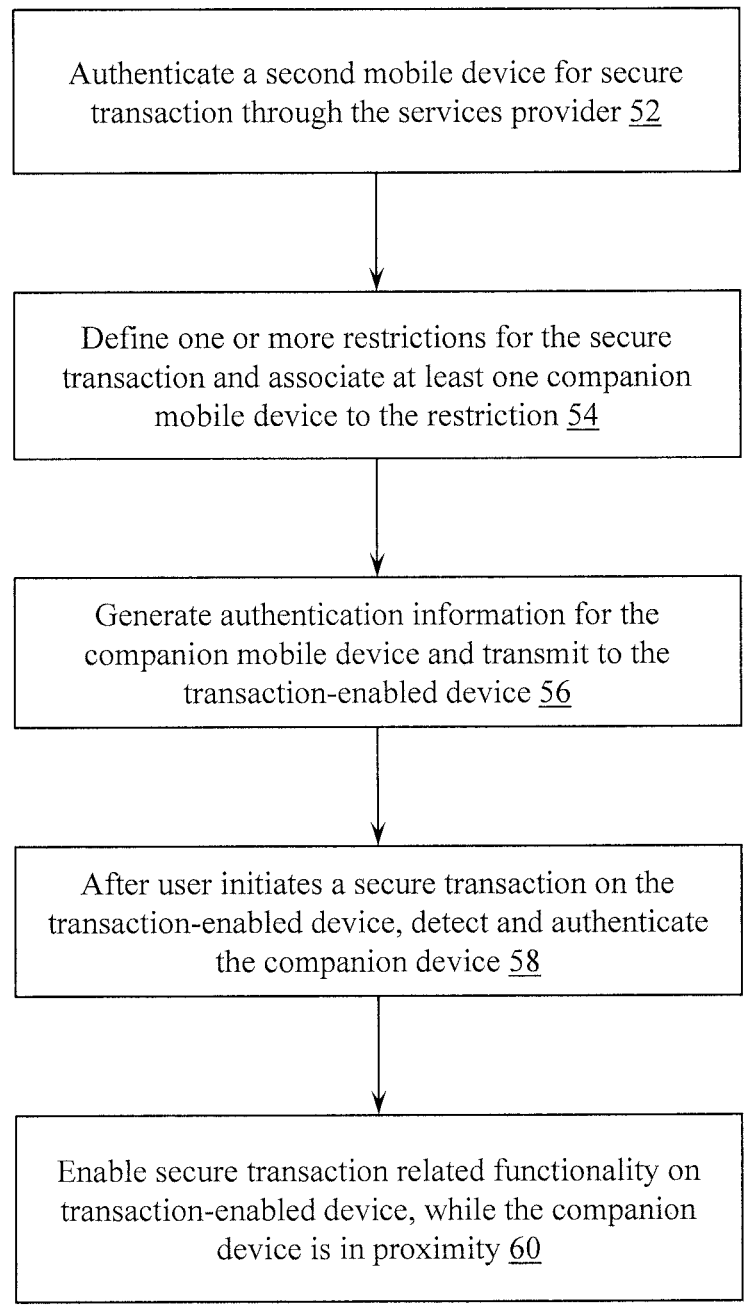
FIG. 1 is a flow chart illustrating an embodiment of an exemplary secure transaction process.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Provided are methods for authenticating a mobile device for secure transactions, such as an electronic payment transaction. Systems suitable for practicing methods of the present disclosure are also provided.

In various embodiments, a master device, such as a smartphone, is adapted to engage in a secure transaction, such as making an electronic payment at a merchant point of sale terminal. The user of the master device may delegate the authority to enter into the secure transaction to a second mobile device, such as a smart watch. The user may also establish a trust association between the second device and a third mobile device, such as clothing with wearable technology. As used herein, the second device may be referred to as "transaction-enabled device" and the third trusted device may be referred to as a "companion device."

When the user of the transaction-enabled device initiates a secure transaction, the device verifies that a companion device is in communication with the transaction-enabled device. Access to the secure transaction is allowed only if, and while, the companion device is in communication with the transaction-enabled device. If the companion device is not detected, access to the secured transaction on the transaction-enabled device may be either denied or restricted. In one embodiment, an attempt to access the secure function without the companion device (for example, if the transaction-enabled device is lost or stolen), may result in the secured function being disabled and/or confidential information being purged from the transaction-enabled device. The secure transaction can then be restored on the device by reauthenticating the device through the master device. In various embodiments, the user may allow restricted use of the secure transaction when the companion device is absent, for example, by establishing a spending limited ($20 per transaction), or setting geographic or other restrictions.

FIG. 1 is a flow chart 50 illustrating an embodiment of an exemplary secure transaction process. A user operates a master device (e.g., a smart phone), which is authenticated for secure transactions through a service provider. In this embodiment, the user accesses a corresponding account managed by the service provider and identifies a second mobile device (e.g., a smart watch) to which the user desires to delegate authority for the secure transaction. In step, 52, the user authenticates the second mobile device for secure transactions through the service provider. In various embodiments, authentication may include user and device authentication. User authentication may include a username and password combination, biometric authentication (e.g., fingerprint scan) or other user authentication as available through the second device. Device authentication may include a unique device identifier, shared encryption keys, a unique token and other authentication techniques and protocols. The service provider generates unique authentication information for the second device, which is transmitted to and stored on the transaction-enabled device. In one embodiment, the second device is adapted to facilitate an electronic payment and receives a payment token from the master device which is associated with the master account and second device. In various embodiments, one or more tokens may be used, and the tokens may be single use or multi-use. The tokens may be generated and transmitted to the second device by the master device, the service provider or a third party token service. In various embodiments, the service provider may communicate with the transaction-enabled device or communicate with the master device, which forwards the authentication information to the transaction-enabled device.

In step 54, the user defines one or more restrictions on the use of and/or access to the secure transaction on the transaction-enabled device and associates at least one companion device to the restriction. In one embodiment, the user associates a companion device which must be in proximity to the transaction-enabled device to enable the secure transaction. The service provider generates authentication information for the companion device and transfers the information to the transaction-enabled device in step 56. In various embodiments, the restrictions may include denying access to the secure transaction unless the companion device is in proximity to the transaction-enabled device, limiting access to certain secured features or restricting secure transaction parameters. For example, if the transaction-enabled device is a fitness watch that the user wears while jogging, the secure transaction features may be limited to allow the user to make a purchase up to a limited amount (e.g., $20) within a certain geographic area associated with the activity.

In step 58, the user initiates a secure transaction through the transaction-enabled device, searches for the companion device and attempts to authenticate the companion device if found. In one embodiment, the secure transaction is disabled unless the transaction-enabled device locates and authenticates a companion device. The transaction-enabled device may search for a companion device using a short range wireless protocol (e.g., Bluetooth) and if communication is established with the companion device, the transaction-enabled device initiates an authentication protocol with the companion device. Through the authentication protocol, the companion device transmits authentication information to the transaction-enabled device which is then verified by the transaction-enabled device. If the companion device is authenticated, the secure transaction is enabled in step 60, and the user will have access to the secure transaction for as long as the companion device remains in communication with the transaction-enabled device.

In one embodiment, the secure transaction is an electronic purchase from a merchant and the transaction-enabled device prepares and transmits encrypted transaction data, a payment token and a digital signature to a merchant's point-of-sale terminal, which forwards the information to the service provider for processing. The encrypted transaction information and digital signature may include a timestamp and unique devices identifiers for each of the transaction-enabled device and companion device.

Figure 2:
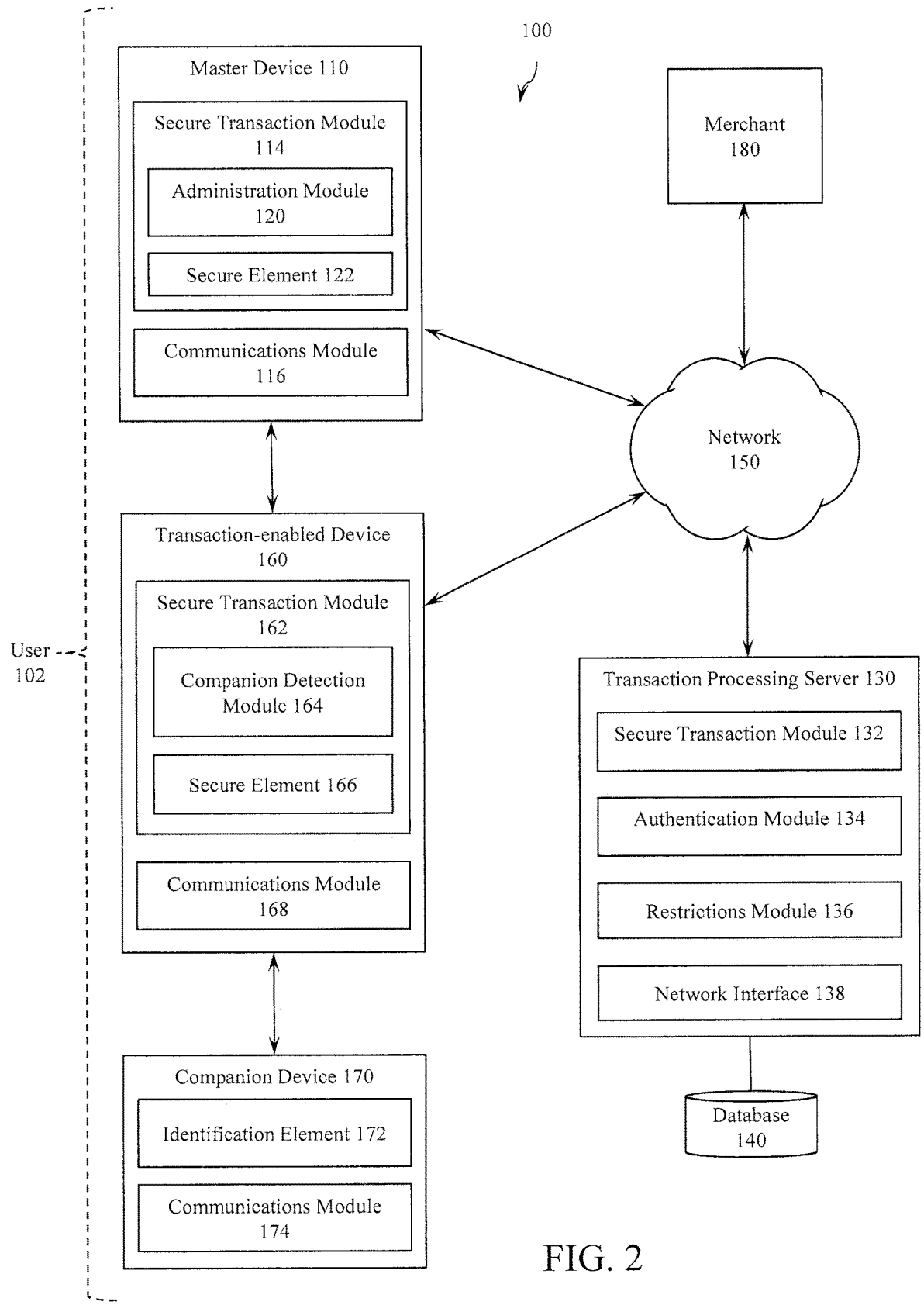
FIG. 2 is an embodiment of an exemplary network system suitable for processing a secure transaction.

Referring to FIG. 2, an exemplary embodiment of a network system 100 suitable for implementing the processes described herein is illustrated. As shown, system 100 may comprise or implement a plurality of devices, servers, and/or software components that operate to perform various methodologies in accordance with the described embodiments. Exemplary devices and servers may include device, stand-alone, and enterprise-class servers, operating an OS such as a MICROSOFT® OS, a UNIX® OS, a LINUX® OS, or other suitable device and/or server based OS. It can be appreciated that the devices and/or servers illustrated in FIG. 2 may be deployed in other ways and that the operations performed and/or the services provided by such devices and/or servers may be combined or separated for a given embodiment and may be performed by a greater number or fewer number of devices and/or servers. One or more devices and/or servers may be operated and/or maintained by the same or different entities.

System 100 comprises a user 102, a master device 110, a transaction-enabled device 160, a companion device 170 and a transaction processing server 130 in communication over a network 150. Master device 110, transaction processing server 130, transaction-enabled device 160 and companion device 170 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 150.

Master device 110 may be implemented using any appropriate hardware and software configured for wired and/or wireless communication with transaction processing server 130 and transaction-enabled device 160. In various embodiments, master device 110 may be implemented as a smart phone, tablet, laptop computer, wristwatch with appropriate computer hardware resources, eyeglasses with appropriate computer hardware, clothing with wearable technology with appropriate computer hardware, and/or other types of computing devices capable of transmitting and/or receiving data as described herein. Although a single master device is shown, the master device may be managed or controlled by any suitable processing device, and may include a plurality of devices that function similarly. Moreover, in various embodiments, one or more of the applications, processes, and/or features discussed below in reference to master device 110 may be included in a communication device connected to master device 110.

Master device 110 of FIG. 2 comprises a secure transaction module 114 and a communication module 116. In other embodiments, master device 110 may include additional or different modules having specialized hardware and/or software as required. Secure transaction module 114 comprises one or more hardware and software processes to facilitate a secure transaction through the transaction processing server 130. In one embodiment, the secure transaction module 114 facilitates an electronic payment and includes corresponding hardware and software which may comprise secure storage for maintaining data for authenticating the master device 110 to the transaction processing server 130.

The secure transaction module 114 comprises an administration module 120 and a secure element 122. The administration module 120 provides the user 102 with an interface to manage transactions, interface with the transaction processing server 130 and administer the delegation of secure transactions to other devices as described herein. Through the administration module 120, the user 102 sets, accesses, and/or determines appropriate restrictions for entering into secure transactions through the transaction-enabled device 160.

The communications module 116 is adapted to communicate with the service provider server 130 over the network 150 and transaction-enabled device 160. In one embodiment, the communications module 116 is further adapted to communicate with merchant point-of-sale devices to facilitate an electronic transaction. In various embodiments, communications module 118 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices. Communications module 116 may communicate directly with the transaction-enabled device 160 using short range wireless communications, such as Bluetooth Low Energy, LTE Direct, radio frequency, infrared, Bluetooth, and near field communications.

Transaction-enabled device 160 may be implemented using any appropriate hardware and software and includes a communications module 168 configured for wired and/or wireless communication with master device 110, companion device 170 and transaction processing server 130. In various embodiments, transaction-enabled device 160 may be implemented as a smart phone, tablet, laptop computer, wristwatch with appropriate computer hardware resources, eyeglasses with appropriate computer hardware, clothing with wearable technology with appropriate computer hardware, and/or other types of computing devices capable of transmitting and/or receiving data as described herein. Although only one transaction-enabled device 160 is shown, a plurality of primary devices 160 may be implemented within the spirit of this embodiment. Moreover, in various embodiments, one or more of the applications, processes, and/or features discussed below in reference to transaction-enabled device 160 may be included in a communication device connected to transaction-enabled device 160.

The transaction-enabled device 160 also comprises a secure transaction module 162 which is adapted to facilitate a secure transaction with the transaction processing server 130, and may correspond to specialized hardware and/or software utilized by transaction-enabled device 160. The secure transaction module 162 comprises a companion detection module 164 and a secure element 166. When user 102 initiates a secure transaction using the secure transaction module 162, the companion detection module 166 attempts to pair with a companion device 170. If the companion detection module 166 detects a companion device 170, the transaction proceeds and transaction information, unique device information received from the companion device 170, unique device information of the transaction-enabled device 160 and encryption parameters received from transaction processing server 130 are used to create a transaction message for delivery to transaction processing server 130. In one embodiment, the transaction-enabled device 160 provides the transaction message to a point-of-sale terminal and the transaction message is forwarded to the transaction processing server 130 by a corresponding merchant. In another embodiment, the transaction message is forwarded to transaction processing server 130 over the network 150. The transaction processing server 130 deconstructs the transaction message to authenticate the user 102, transaction-enabled device 160 and companion device 170 to authorize the transaction.

If the companion detection module 166 loses connection with the companion device 170, then the secure transaction module 162 will be disabled from further processing of the secure transaction until another companion device is detected and authenticated. In one embodiment, secure element 166 is a tamper resistant secure storage for storing one or more tokens and other authentication data to authenticate the transaction-enabled device to the service provider 130. In other embodiments, secure element 166 can be any suitable storage element, with different levels or types of security, including a non-secure storage element. In various embodiments, one or more features of the transaction-enabled device 160 may be combined so as to provide their respective features in one module.

In one embodiment, companion detection module 164 authenticates the identity of the user 102 by detecting and connecting with a companion device 170 associated with user 102 and receiving additional identification information and authentication information from the companion device 170. The companion device 170 comprises an identification element 172 and a communications module 174. The connection between the transaction-enabled device 160 and the companion device 170 may utilize short range wireless communications. For example, companion detection module 164 may pair with the companion device 170 and request a unique device identifier of secondary device 170. The identification element 172 transmits a universally unique identifier associated with the companion device 170 to the primary device 160. In various embodiments, the identification element 172 may include an RFID, a code stored in a volatile memory, a hardware device identifier and a secure element.

The companion detection module 164 may transmit the request to establish the connection with companion device 170 as a short range wireless communication (e.g. a BLE protocol communication) including a "wake up" process for the companion device 170. In other embodiments, the request and/or connection may utilize near field communication, radio communication, infrared communication, or Bluetooth communication. Additionally, although transaction-enabled device 160 may utilize BLE protocol communications to effectuate an "always on" type service where the unique deice identifier and "wake up" process are transmitted continuously by transaction-enabled device 160 during the secure transaction, other communication protocols used to provide an "always on" service may include LTE Direct or similar device-to-device communication technology. BLE and LTE Direct may both be utilized to provide discovery of nearby devices to transaction-enabled device 160.

In various embodiments, secure transaction module 162 also requests a log in or other identifier from user 102 that authenticates user 102. In such embodiments, user 102 may provide an identifier, user account name, password, and/or PIN directly to transaction-enabled device 160 or companion device 170. User 102 may also be identified using biometrics and biometric reading devices such as a fingerprint scanner or eye/retinal scanner. The identification information may be entered to either device using an interactive touch screen, a keyboard, a mouse, a biometric reader, or other input device available on either transaction-enabled device 160 or companion device 170. The user 102 authentication information may be stored in the secure element 166 or transaction processing server 130 as appropriate for authenticating the identity of user 102.

In various embodiments, the master device 110, transaction-enabled device 160 and companion device 170 may include other applications and features as may be desired to provide features to user 102. For example, the devices may include security applications for implementing client-side security features, programmatic client applications for interfacing with appropriate application programming interfaces (APIs) over network 150, games, fitness tracking applications, email, texting, voice and IM applications, and other application and features. The communications modules 116, 168 and 174 may also correspond to mobile, satellite, wireless Internet, and/or radio communication applications. The applications may further include payment applications and/or services, for example, applications/services that may provide payments, purchases made by a user of the device (e.g., user 102 and/or a person/entity exerting control over the device), and/or other payments during use of the device, or GPS applications configured to display location information to user 102. The devices may also include financial applications, such as banking, online payments, money transfer, or other financial applications, software programs, executable by a processor, including a graphical user interface (GUI) configured to provide an interface for user 102. Any application can be implemented in a secure transaction module described herein to provide restrictions and authentication as described herein.

The transaction processing server 130 may be maintained, for example, by a service provider offering the secure transaction services, and is accessed by the user to administer user accounts, to authenticate devices and enable secure transactions. For example, transaction processing server 130 may correspond to or be associated with an electronic payment service. In this regard, transaction processing server 130 includes one or more processing applications which may be configured to interact with master device 110, transaction-enabled device 160 and a merchant 180 to authorize devices and communications for a secure transaction. Although only one server is shown, a plurality of servers and/or associated devices may function similarly.

Transaction processing server 130 includes a secure transaction module 132, an authentication module 134, a restrictions module 136, a network interface 138 and a database 140. In other embodiments, the transaction processing server 130 may include additional or different modules having specialized hardware and/or software as required.

The transaction processing server 130 may be controlled by a service provider which provides a service over the network 150 associated with the secure transaction modules 114 and 162. For example, the transaction processing server 130 may correspond to a payment service provider, a merchant, a transportation service provider, a media provider, or other type of service provider. In this regard, transaction processing server 130 includes one or more servers incorporating one or more processing applications which may be configured to interact with master device 110, transaction-enabled device 160 and/or merchant 180. In one example, transaction processing server 130 may be provided by PAYPAL®, Inc. of San Jose, Calif., USA. Although only one server is shown, a plurality of servers and/or associated devices may function similarly. Other applications may also be included that correspond to processes, procedures, and/or applications, for example, a software program, executable by a hardware processor. In other embodiments, transaction processing server 130 may include additional or different modules having specialized hardware and/or software as required.

Secure transaction module 132 may correspond to one or more processes and associated devices to process some action taken with regard to use of the secure transaction module 114 or 162. Secure transaction module 132 may correspond to specialized hardware and/or software utilized by transaction processing server 130 to receive a request to process an action by user 102 when user 102 is utilizing the secure transaction module 162 of transaction-enabled device 160. For example, an action processed by secure transaction module 132 may correspond to a payment to the merchant 180.

Secure transaction module 132 may also enforce authentication and restriction requirements on the use and performance of the transaction-enabled device 160. Thus, if the action is received from transaction-enabled device 160 by secure transaction module 132, secure transaction module 132 may authenticate the user and device using the authentication module 134 or determine if a restriction is placed on the action via restriction module 136 prior to processing the transaction. Secure transaction module 142 may then proceed with the requested transaction if the authentication and restriction requirements are satisfied. The transaction processing server 130 may include other applications as desired to provide additional services and features to user 102, such as security applications for implementing server-side security features, programmatic server applications for interfacing with appropriate application programming interfaces (APIs) over network 150, or software programs, executable by a processor, including a graphical user interface (GUI), configured to provide an interface to a user.

Additionally, transaction processing server 130 includes database 140 storing user accounts and related transaction and configuration information, including the transaction-enabled devices, companion devices, restrictions and authentication information. User accounts in database 140 may include user information, such as name, address, birthdate, payment/funding information, additional user financial information, and/or other desired user data. Account holders may link to their respective accounts through a user, device identifier and other authentication information. For example, when a device identifier is transmitted to transaction processing server 130, e.g. from transaction-enabled device 160, an account may be found. Database 140 may store received information, such as actions for processing, and user identification information.

In various embodiments, transaction processing server 140 includes at least one network interface 138 adapted to communicate with master device 110, transaction-enabled device 160 and/or merchant 180 over network 150. In various embodiments, network interface component 148 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Restrictions module 132 may correspond to one or more processes to execute modules and associated devices of transaction processing server 130 to set, manage, and/or access/determine restrictions. In this regard, restrictions module 132 may correspond to specialized hardware and/or software utilized by transaction processing server 130 with master device 110 to set and/or manage restrictions for user 102 and/or a transaction-enabled device 160. Restrictions for user 102 and/or the devices associated with the user 102 may be set and managed by user 102, a person/entity associated with user 102 (e.g., a guardian for user 102, a workplace for user 102 providing one or more vehicles to user 102, etc.), and/or a person/entity exerting control over the devices associated with user 102. In one embodiment, the restrictions module 132 communicates with the secure transaction module 132 on the master device 110.

Authentication module 134 may correspond to one or more processes to execute module and associated devices of transaction processing server 140 to generate, store and exchange authentication information and authenticate devices and transactions. Authentication module 134 uses database 140 to store device, user and authentication information which may include devices identifiers, user identification, user account information and authentication information such as encryption keys and tokens.

Network 150 may be implemented as a single network or a combination of multiple networks. For example, in various embodiments, network 150 may include the Internet or one or more intranets, landline networks, wireless networks, and/or other appropriate types of networks. Network 150 may correspond to small scale communication networks, such as a private or local area network, or a larger scale network, such as a wide area network or the Internet, accessible by the various components of system 100.

Figure 3:
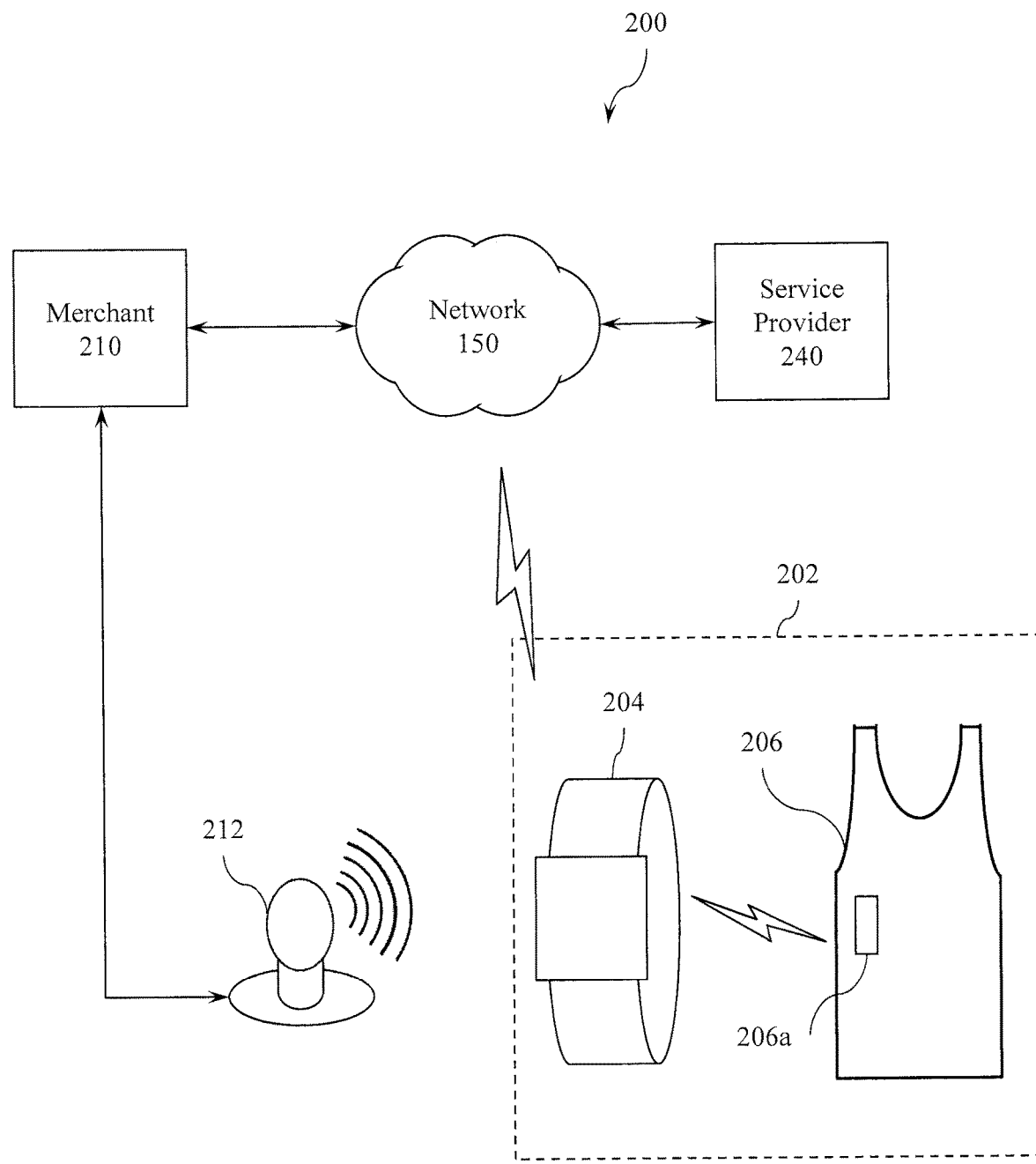
FIG. 3 is an embodiment of an exemplary network system suitable for processing a secure transaction.

Referring to FIG. 3, an embodiment of an exemplary network system suitable for processing a secure transaction is illustrated. Environment 200 includes a user 202 corresponding generally to user 102 of FIG. 2, with a transaction-enabled device 204 and a companion device 206, that correspond generally to the transaction-enabled device 160 and companion device 170 of FIG. 2. As illustrated, the transaction-enabled device 204 is a fitness watch, which may be used to track user 202's performance activity during exercise such as heart rate, exercise time, and distance via GPS. Companion device 206 is a body monitoring shirt 206 that include circuitry for measuring user 202's biometric characteristics during exercise, such as heart rate, and transmitting the data to the watch 204.

In environment 200, user 202 desires to purchase a good or service (e.g., food and drink) from a merchant 210 using the watch 204, which has been authenticated as a transaction-enabled device through service provider 240. The user 202 activates a secure payment application on the watch 204, and the watch 204 searches for the shirt 206 as a companion device and requests authentication information. In one embodiment, the watch 204 establishes a secure wireless communication with network 150 to access service provider 240 and transmits unique identification information from the shirt 206 (secondary device) and watch 204 (primary device) to the service provider 240 to authenticate the watch 204 for payment. If service provider 240 authenticates the two devices, then the secure payment application on the watch is enabled and user 202 can use the watch 204 the make an electronic payment through the merchant 210's point of sale terminal 212, such as through near field communication. As illustrated in environment 200, the watch 204 will only be enabled for payment at merchant 210 if the watch 204 is in communication with shirt 206. In an alternate embodiment, after the watch 204 receives authentication information from the shirt 206, the watch 204 prepares an electronic message including a timestamp, transaction information, and authentication information for both the watch 204 and the shirt 206, and the electronic message is transmitted to the merchant 210 through the point-of-sale terminal 212. The merchant 210 forwards the transaction message to the service provider 240, which verifies the watch 204 and shirt 206 before proceeding to authorize the transaction.

Figures 4A, 4B:
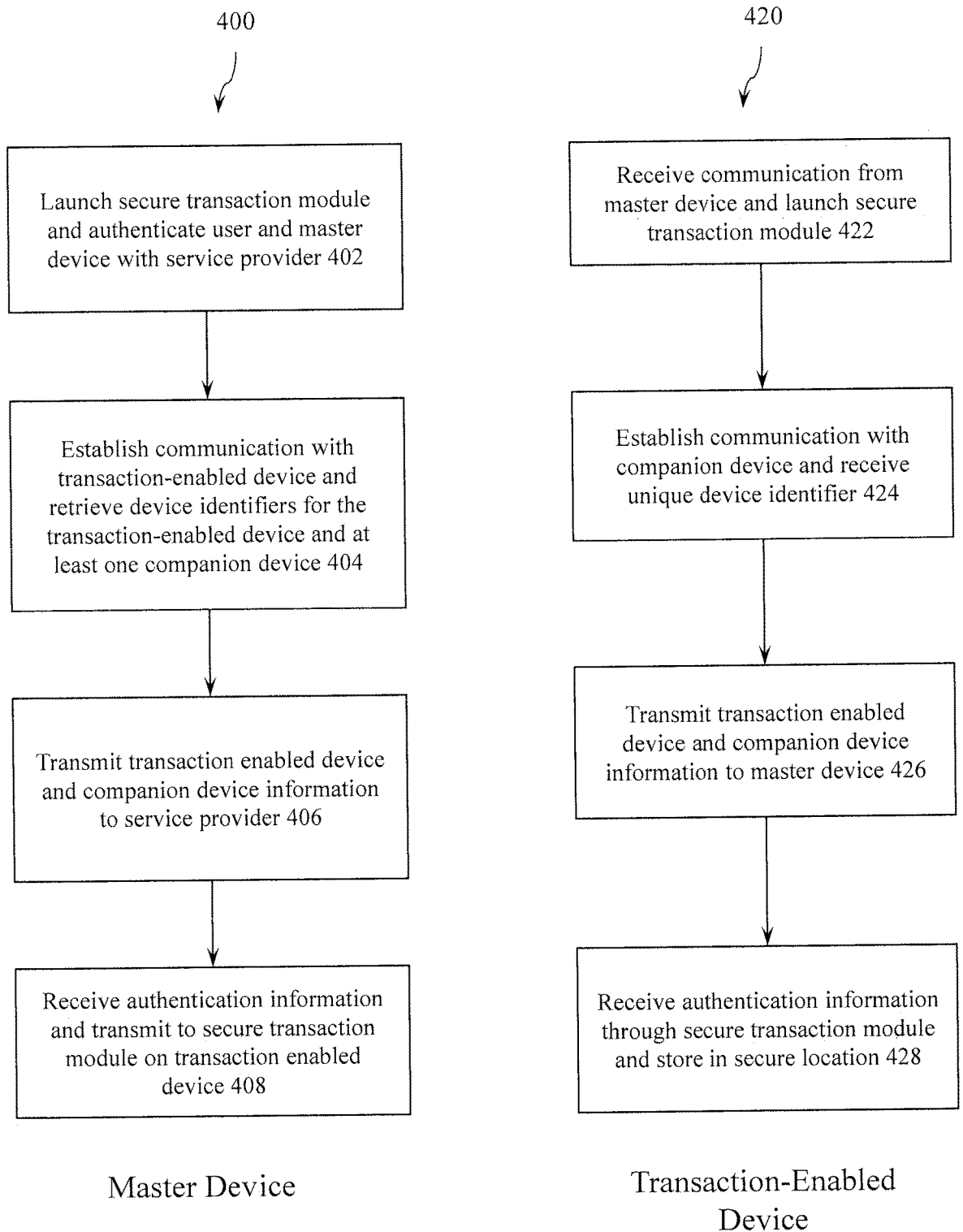
FIGS. 4a-b are flow charts illustrating an embodiment of an exemplary device authentication process.

Referring to FIGS. 4a-b, exemplary flow charts for an embodiment of delegating a secure transaction from a trusted user device to a second device is illustrated. Note that one or more steps, processes, and methods described herein may be omitted, performed in a different sequence, or combined as desired or appropriate.

In one embodiment, a user accesses a master device to execute the steps of the process 400. In step 402, the user launches the secure transaction module on the trusted master device and establishes a secure communication session with the secure transaction server. In an exemplary embodiment, the secure transaction module is an electronic payment application accessible through the user interface of the master user device. In one embodiment, the user is prompted to enter identifying information, such as a username and password, personal identification number, fingerprint scan, retinal scan, or facial or voice recognition. As a trusted device, the master device also exchanges authentication information to authenticate the device, such as device identifiers, tokens and one or more encryption keys.

In step 404, the user selects a second device that will operate as a transaction-enabled device, and the master device establishes a communication with a secure transaction module of the second device. The second device searches for available companion devices that are in proximity, the user selects an available companion device and the second device requests device authentication information. The second device returns unique device identifiers for the second device and the selected companion device to the master device.

The master device receives the device identifiers for the second device and the companion device and in step 406, transmits the second device information and companion device information to the service provider. In step 408, the master device receives authentication information from the service provider, which may include a token and one or more encryption keys for each device, and the master device transmits the authentication information to the secure transaction module on the secondary device for storage in the secure element. In one embodiment, the service provider generates a public-private key pair (e.g., using SRP or RSA public-key encryption techniques) for each device to be authenticated, with the service provider storing the public key and the private key being stored on an associated user device.

FIG. 4b is a flow chart 420 of an exemplary process performed by a second device for authenticating the device as a transaction-enabled device for a secure transaction. In step 422, the second device receives communication from the secure transaction module of the master device and launches a corresponding secure transaction module. In step 424, the second device searches for a companion device and receives a unique device identifier for the companion device. In an exemplary embodiment, the second device identifies available wireless devices in range and allows the user to select the companion device to associate with the transaction-enabled device. In various embodiments, the list of available companion devices is presented to the user on the second device, on the master device or on another device such as a laptop computer. The short range communication protocol may comprise one of near field communication, radio communication, infrared communication, Bluetooth communication, Bluetooth Low Energy (BLE) communication, LTE Direct communication, and WiFi communication.

In step 426, the second device transmits the unique device identifiers for the second and companion devices to the master device. In step 428, the second device receives authentication information from the master device via the secure transaction module. The authentication information from the second device is stored in the secure element, and the authentication information for the companion device is transmitted to the companion device for storage. The second device also stores the companion device and restriction information for that device in the secure element. In alternate embodiments, the second device communicates with the service provider over the network, bypassing the master device in steps 426 and 428.

In various embodiments, the master device may delegate a secure transaction to a plurality of transaction-enabled devices, and each transaction-enabled device may be configured to operate with a plurality of companion devices. In one embodiment, the master device may also be used as a companion device. In other embodiments, the authentication protocol used for the companion device may depend on the features of the companion device and may include (i) the companion device transmitting a device identifier, (ii) the companion device storing a private key and encrypting the device identifier for transmission to the transaction-enabled device, (iii) the companion device receiving data from the transaction-enabled device, encrypting the received data with the device private key and returning the encrypted message, and other authentication techniques and protocols as appropriate.

Figure 5:
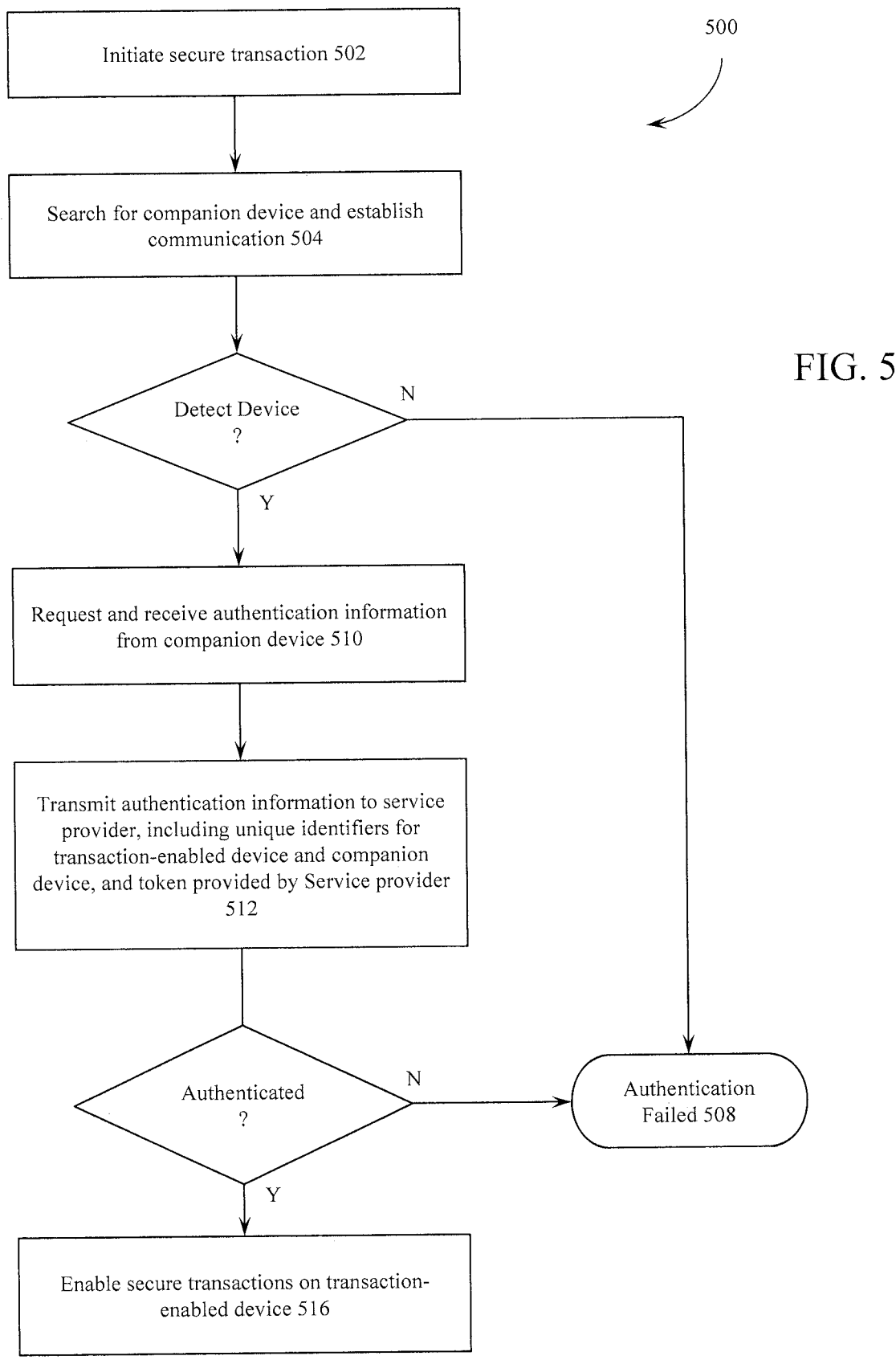
FIG. 5 is a flow chart illustrating an embodiment of an exemplary electronic payment process.

FIG. 5 is a flow chart 500 of an exemplary process for enabling a secure transaction on a transaction-enabled device. In step 502, the user initiates a secure transaction from the transaction-enabled device. The transaction-enabled device attempts to connect to companion device in step 504. In one embodiment, the transaction-enabled device stores companion device identification information for use in searching for and connecting to a companion device. If a companion device is not detected in close proximity to the transaction-enabled device, then the user is notified that authentication has failed in step 508. In one embodiment, step 508 disables further transaction processing, which may include purging confidential information from the secure element, until the transaction-enabled device is reauthenticated through the master device. In other embodiments, step 508 includes notifying the master device and/or service provider of the failed authentication attempt, determining whether the transaction-enabled device has been lost or stolen, and/or disabling further transaction processing via the service provider until the device is reauthenticated through the master device.

If a companion device is detected, the transaction-enabled device requests and receives authentication information from the companion device step 510. In step 512, authentication information is transmitted to the service provider, including and identification of the transaction-enabled device and the companion device, and a token received from the transaction-enabled device during device authentication. In various embodiments, the secure transaction module of the transaction-enabled device uses (i) companion device authentication information received from the companion device and (ii) transaction-enabled device authentication information, to prepare an authentication message for the service provider. In various embodiments, the message may include transaction information such as price, payee identification, a timestamp, an electronic token and all or a portion of the message may be encrypted using one or more encryption keys received from the service provider. In one embodiment, the message is provided to a merchant who forwards the message to the service provider for authorization of the payment. In another embodiment, the message is sent to the service provide for pre-authorization and once approved, payment information is provided to the merchant to complete the transaction. For example, the service provider could return a QR code that may be scanned at the merchant.

The service provider will decrypt the message using corresponding public keys and compare the token and device identifiers to information stored in the database of the service provider. During device authentication, the devices IDs were transmitted to the service provider and the service provider transmitted a unique token associated with the user account and usable only by the transaction-enabled device. If the decrypted information matches then the transaction-enabled device is authenticated and the secure transaction module is authorized in step 516. If the information does not match, then the authentication fails and the user is notified in step 508. In various embodiments, step 508 further includes disabling secure transaction processing via the service provider and/or the transaction-enabled device, which may include purging confidential information from the secure element of the transaction-enabled device, until the transaction-enabled device is reauthenticated through the master device.

Figure 6:
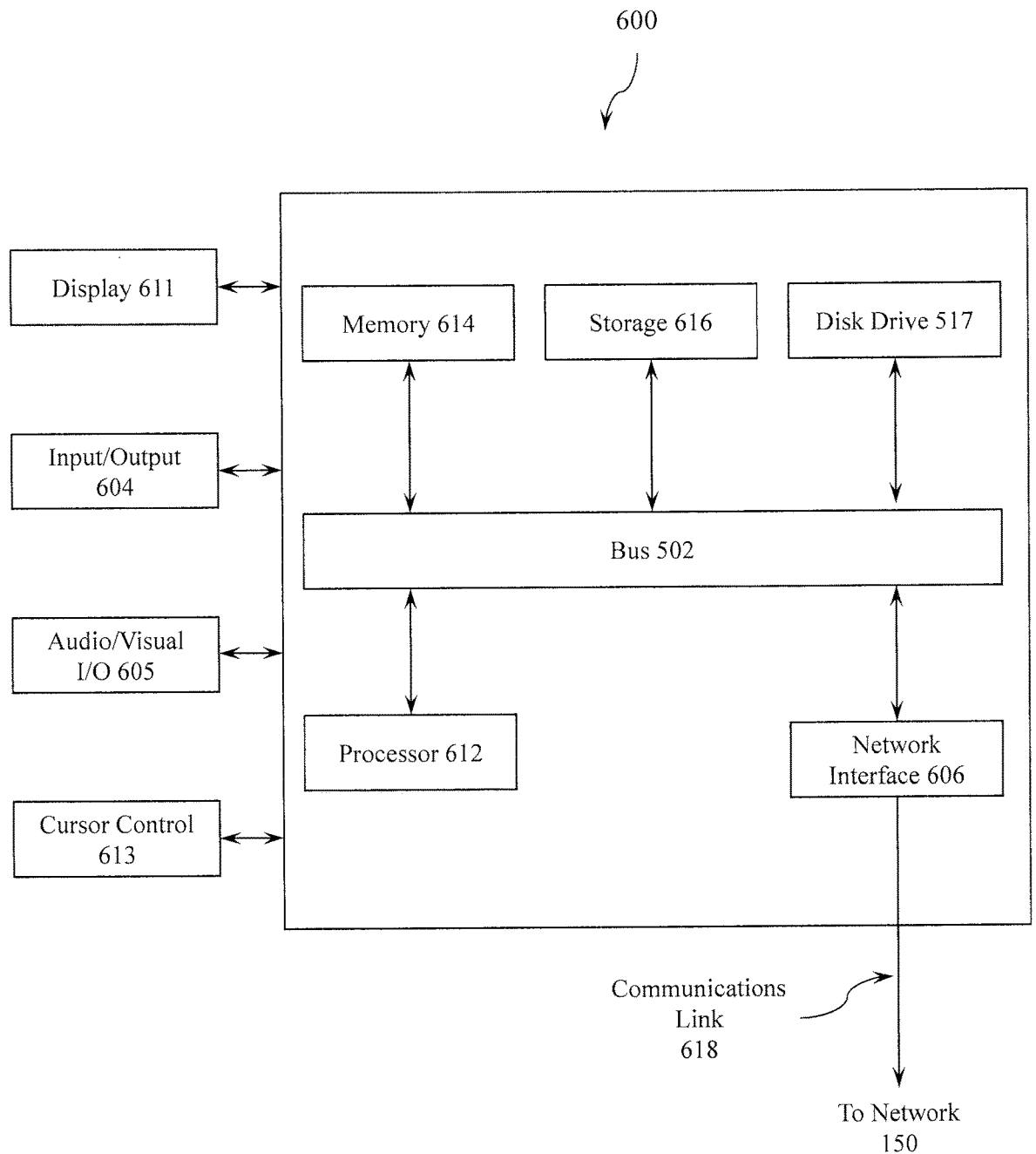
FIG. 6 is an embodiment of an exemplary computer system suitable for implementing one or more components in FIGS. 2 and 3.

FIG. 6 is a block diagram of a computer system suitable for implementing one or more components described in FIGS. 2 and 3, according to an embodiment. In various embodiments, the trusted user device may comprise a personal computing device (e.g., smart phone, a computing tablet, a personal computer, laptop, a wearable computing device such as glasses or a watch, Bluetooth device, key FOB, badge, etc.) capable of communicating with the network 150. The service provider may utilize a network computing device (e.g., a network server) capable of communicating with the network. It should be appreciated that each of the devices utilized by users and service providers may be implemented as computer system 600 in a manner as follows.

Computer system 600 includes a bus 602 or other communication mechanism for communicating information data, signals, and information between various components of computer system 600. Components include an input/output (I/O) component 604 that processes a user action, such as selecting keys from a keypad/keyboard, selecting one or more buttons, image, or links, and/or moving one or more images, etc., and sends a corresponding signal to bus 602. I/O component 604 may also include an output component, such as a display 611 and a cursor control 613 (such as a keyboard, keypad, mouse, etc.). An optional audio input/output component 605 may also be included to allow a user to use voice for inputting information by converting audio signals. Audio I/O component 605 may allow the user to hear audio. A transceiver or network interface 606 transmits and receives signals between computer system 600 and other devices, such as another user device, service device, or a service provider server via network 150. In one embodiment, the transmission is wireless, although other transmission mediums and methods may also be suitable. One or more processors 612, which can be a micro-controller, digital signal processor (DSP), or other processing component, processes these various signals, such as for display on computer system 600 or transmission to other devices via a communication link 618. Processor(s) 612 may also control transmission of information, such as cookies or IP addresses, to other devices.

Components of computer system 600 also include a system memory component 614 (e.g., RAM), a static storage component 616 (e.g., ROM), and/or a disk or flash drive 617. Computer system 600 performs specific operations by processor(s) 612 and other components by executing one or more sequences of instructions contained in system memory component 614. Logic may be encoded in a computer readable medium, which may refer to any medium that participates in providing instructions to processor(s) 612 for execution. Such a medium may take many forms, including but not limited to, non-volatile media, volatile media, and transmission media. In various embodiments, non-volatile media includes optical or magnetic disks, volatile media includes dynamic memory, such as system memory component 514, and transmission media includes coaxial cables, copper wire, and fiber optics, including wires that comprise bus 602. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 600. In various other embodiments of the present disclosure, a plurality of computer systems 600 coupled by communication link 618 to the network (e.g., such as a LAN, WLAN, PTSN, and/or various other wired or wireless networks, including telecommunications, mobile, and cellular phone networks) may perform instruction sequences to practice the present disclosure in coordination with one another.

Figure 7A:
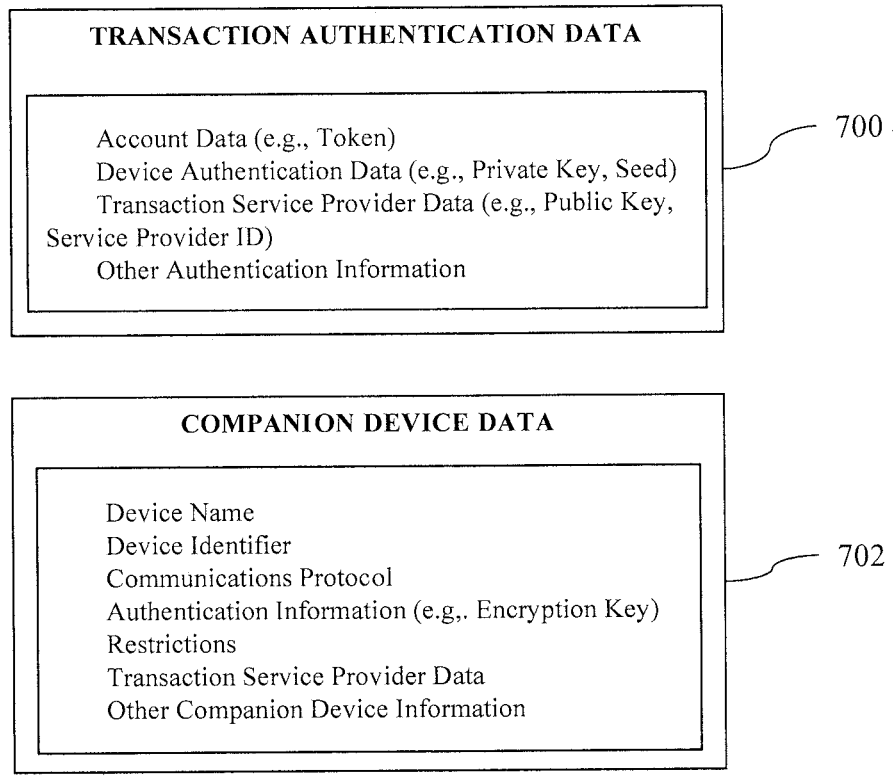
FIGS. 7a-b are exemplary data structures illustrating embodiments of information stored at the transaction-enabled device and transaction processing server, respectively.
Figure 7B:
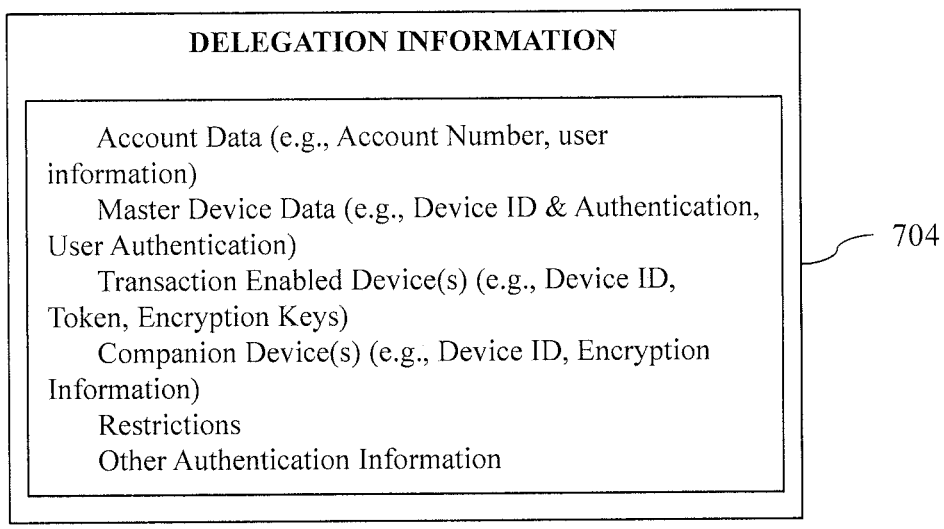

FIGS. 7a-b illustrate exemplary data structures for stored information at the transaction-enabled device and transaction processing server, respectively. In FIG. 7a, the transaction-enabled device stores transaction authentication data 700 and companion device data 702. The transaction authentication data 700 includes account data, device authentication data, transaction service provider data and other authentication data as required by the transaction processing server. In one embodiment, the transaction authentication data 700 is provided by the transaction processing server during authentication of the transaction-enabled device and includes a payment token associated with the user account, a private encryption key for use by the transaction-enabled device in digitally signing transaction messages, and identifying information for the service provider. In various embodiments, the transaction authentication data may include other data corresponding to one or more electronic payment protocols used by the transaction processing server. The companion device data 702 includes information for locating and authenticating a companion device.

Referring to FIG. 7b, the transaction processing server stores delegation information and authentication information mapping the user account to one or more master devices, one or more transaction-enabled devices and one or more companion devices. The account data may include an account number and user information. The master device data may include a device identifier and information for device and user authentication. The transaction-enabled device data may include a device ID, payment token, and encryption keys. The companion device information may include a device ID for the companion device and encryption key for decoding companion device message.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A method for delegating transactions from a first device of a user to a second device, the second device being a mobile device of the user, the method comprising:
  determining a geographic area associated with when the user is wearing the second device based on a type of the second device;
  generating, using a user account of the user associated with the first device, a plurality of one-time use payment tokens for electronic transaction processing via the second device;
  storing, to the second device, the plurality of one-time use payment tokens;
  limiting, based on the geographic area, a purchase amount and a purchase location available for an electronic payment transaction made via the second device using the plurality of one-time use payment tokens when the user is wearing the second device within the geographic area;
  receiving a processing request for the electronic payment transaction through the second device;
  accessing authentication information, from the second device, for the user account of the user associated with the first device, wherein the authentication information is associated with a third device of the user, and wherein the authentication information was previously provided to the second device based on an authentication of the second device by the first device;
  determining that the third device is not within a first distance to the second device based on the authentication information;
  disabling an application function that enables processing of the electronic payment transaction through the second device, wherein the disabling prevents transmission of the plurality of one-time use payment tokens via the second device;
  disabling the electronic transaction processing using the user account with a service provider based on the determining that the third device is not within the first distance;
  requesting a reauthentication of the second device from the first device;
  receiving the reauthentication from the first device;
  detecting the third device is now within the first distance to the second device;
  receiving the authentication information for the third device based on the detecting;
  authenticating the third device using the authentication information;
  accessing one of the plurality of one-time use payment tokens based on the authentication information from the third device;
  restoring the application function in response to the accessing and the reauthentication; and
  processing, using the application function, the one of the plurality of one-time use payment tokens, and a digital signature having a timestamp for the second device, the electronic payment transaction through the second device while the third device is detected within the first distance to the second device based on the authentication information and whether the electronic payment transaction complies with the purchase amount and the purchase location.

2. The method of claim 1 wherein the stored authentication information is further associated with the second device, including the one of the plurality of one-time use payment tokens associated with the second device and a private key associated with the second device.

3. The method of claim 2 wherein the stored authentication information further comprises a public key associated with the third device.

4. The method of claim 3 wherein the processing comprises:
establishing a communication between the second device and a third party device;
receiving transaction data from the third party device;
using the private key associated with the second device, encrypting the transaction data, second device authentication information and third device authenticating information to generate a transaction message; and
transmitting the transaction message to the third party device.

5. The method of claim 3 wherein the authenticating further comprises performing on the first device:
accessing the user account;
connecting to the second device;
receiving a second device identifier associated with the second device;
receiving a third device identifier associated with the third device; and
requesting authentication information for the second device, as a transaction-enabled device, and the third device, as a companion device.

6. The method of claim 1 wherein the detecting further comprises:
determining detection information for the third device through the stored authentication information; and
running a short range communication protocol associated with the third device comprising one of near field communication, radio communication, infrared communication, Bluetooth communication, Bluetooth Low Energy (BLE) communication, LTE Direct communication, or WiFi communication.

7. A system for delegating transactions to a secondary device, the system comprising:
a secure transaction module, implemented on a first one or more hardware processors coupled with a first non-transitory memory, wherein the first one or more hardware processors are configured to read instructions from the first non-transitory memory to cause the secure transaction module to process the transactions for a user using a user account of the user associated with a first device of the user and a digital signature having a timestamp for the secondary device of the user, generate, using the user account, a plurality of one-time use payment tokens for electronic transaction processing via the secondary device, and store, to the secondary device, the plurality of one-time use payment tokens;
a database storing user account information, including an account identifier and an associated device authentication information for at least the first device of the user authenticated by a service provider for the transactions associated with the account identifier of the user;
an authentication module, implemented on a second one or more hardware processors, wherein the second one or more hardware processors are configured to read instructions to cause the authentication module to receive a transaction associated with the secondary device of the user, the received transaction including authentication information associated with a third device of the user when the third device is within a wireless signal range of the secondary device, and authenticate the received transaction if the secondary device and the third device are within the wireless signal range and if the received transaction complies with a purchase amount and a purchase location available to be made via the secondary device when the user is in possession of the secondary device within a geographic area; and
a restriction module, implemented by a third one or more hardware processors, wherein the third one or more hardware processors are configured to read instructions to cause the restriction module to determine the geographic area associated with when the user is in possession of the secondary device, limit, based on the geographic area, the secondary device by the purchase amount and the purchase location available to be made via the secondary device using the plurality of one-time use payment tokens within the geographic area, determine that a third device of the user is not within a first distance to the secondary device prior to authenticating the received transaction, disable an application function that enables processing of the received transaction through the secondary device while the third device is not within the first distance to the secondary device, wherein disabling the application function prevents transmission of the plurality of one-time use payment tokens via the secondary device, disable electronic transaction processing using the user account information with the service provider, request reauthentication information of the secondary device by the first device, receive the reauthentication information from the first device, receive the authentication information in response to detecting that the third device is now within the wireless signal range of the secondary device, authenticate the third device using the authentication information, accessing the one of the plurality of one-time use payment tokens based on the authentication information from the third device, and restore the application function based on accessing the one of the plurality of one-time use payment tokens and receiving the reauthentication, wherein the received transaction is authenticated through the application function in response to restoring the application function.

8. The system of claim 7, wherein the stored user account information further includes at least one restriction on the transaction associated with the user account information.

9. The system of claim 7, wherein the associated device authentication information comprises a first device identifier for authenticating the transactions originating from the first device.

10. The system of claim 7, wherein the associated device authentication information comprises a second device identifier and a third device identifier for authenticating the transactions originating from the secondary device.

11. The system of claim 7, wherein the second one or more hardware processors are configured to read instructions to cause the authentication module to generate, using an administration module, the one of the plurality of one-time use payment tokens and an encryption key for the first device.

12. The system of claim 7 wherein the second one or more hardware processors are configured to read instructions to cause the authentication module to deny authentication of the received transaction if either the secondary or third device is not authenticated.

13. The system of claim 7 wherein the authentication of the secondary device includes decrypting the transaction using a stored public key associated with the secondary device.

14. The system of claim 7 wherein the user account information includes a mapping of potential companion devices used to authenticate the secondary device, and wherein the authentication of the secondary and third devices includes verifying an associated mapping of the secondary and third devices in the database.

15. A non-transitory machine-readable medium having stored thereon machine-readable instructions which, when executed by one or more processors, cause a machine to perform operations comprising:
  determining, for a user based on delegating transactions from a first device of the user to a second device, a geographic area associated with when the user is in possession of the second device;
  generating, using a user account of the user associated with the first device, a plurality of one-time use payment tokens for electronic transaction processing via the second device;
  storing, to the second device, the plurality of one-time use payment tokens;
  limiting, based on the geographic area, a purchase amount and a purchase location available for electronic transaction processing performed via the second device using the plurality of one-time use payment tokens when the user is in possession of the second device within the geographic area;
  receiving a request for an electronic transaction through a second device of a user that has been authenticated for a use with a user account associated with a first device of the user, and wherein the first device is also authenticated by a service provider for the use associated with the user account;
  accessing authentication information, from the second device, that was previously provided to the second device based on an authentication of the second device by the first device;
  determining that a third device of the user is not within a first distance to the second device;
  disabling an application function that enables processing of the electronic transaction through the second device, wherein the disabling prevents transmission of the plurality of one-time use payment tokens via the second device;
  disabling the electronic transaction processing using the user account with the service provider;
  requesting a reauthentication of the second device from the first device;
  receiving the reauthentication from the first device;
  detecting the third device is now within the first distance to the second device;
  receiving the authentication information for the third device based on the detecting;
  authenticating the third device using the authentication information;
  accessing the one of the plurality of one-time use payment tokens based on the authentication information from the third device;
  restoring the application function in response to the determining the one of the plurality of one-time use payment tokens and the reauthentication; and
  processing, using the application function, the one of the plurality of one-time use payment tokens, and a digital signature having a timestamp for the second device, the electronic transaction through the second device while the third device is detected within the first distance to the second device and whether the electronic transaction complies with the purchase amount and the purchase location.

16. The non-transitory machine-readable medium of claim 15, wherein the authentication information is further associated with the second device and comprises the one of the plurality of one-time use payment tokens associated with the second device and a private key associated with the second device.

17. The non-transitory machine-readable medium of claim 16, wherein the authentication information further comprises a public key associated with the third device.

18. The non-transitory machine-readable medium of claim 17, wherein the operations further comprise:
  establishing communication between the second device and a third party device;
  receiving transaction data from the third party device;
  encrypting the transaction data, second device authentication information and third device authenticating information using the private key associated with the second device;
  generating a transaction message based on the encrypted transaction data, second device authentication information, and third device authenticating information; and
  transmitting the transaction message to the third party device.

19. The non-transitory machine-readable medium of claim 17, wherein the second device was authenticated by performing on the first device:
  accessing the user account;
  connecting to the second device;
  receiving a second device identifier associated with the second device;
  receiving a third device identifier associated with the third device; and
  requesting authentication information for the second device, as a transaction-enabled device, and the third device, as a companion device.

20. The non-transitory machine-readable medium of claim 16, wherein the detecting further comprises:
  determining detection information for the third device through the authentication information; and
  running a short range communication protocol associated with the third device comprising one of near field communication, radio communication, infrared communication, Bluetooth communication, Bluetooth Low Energy (BLE) communication, LTE Direct communication, or WiFi communication.

* * * * *